United States Patent [19]
Fujiyama

[11] Patent Number: 5,396,310
[45] Date of Patent: Mar. 7, 1995

[54] CAMERA

[75] Inventor: Takashi Fujiyama, Kanagawa, Japan

[73] Assignee: Canon Kabushiki Kaisha, Tokyo, Japan

[21] Appl. No.: 921,761

[22] Filed: Jul. 30, 1992

[30] Foreign Application Priority Data

Aug. 2, 1991 [JP] Japan .................................. 3-194133

[51] Int. Cl.[6] ............................................ G03B 13/36
[52] U.S. Cl. ...................................... 354/400; 354/441
[58] Field of Search ............... 354/410, 412, 429, 434, 354/441, 442, 443, 400

[56] References Cited

U.S. PATENT DOCUMENTS

| | | | |
|---|---|---|---|
| 4,721,976 | 1/1988 | Aihara et al. | 354/441 |
| 4,769,663 | 9/1988 | Yamaki et al. | 354/400 |
| 4,779,115 | 10/1988 | Fujino et al. | 354/443 |
| 4,779,117 | 10/1988 | Fujino et al. | 354/434 |
| 4,908,651 | 3/1990 | Fujino et al. | 354/434 |

FOREIGN PATENT DOCUMENTS 62-168121  7/1987  Japan .
62-168124  7/1987  Japan .

Primary Examiner—Russell E. Adams
Attorney, Agent, or Firm—Fitzpatrick, Cella, Harper & Scinto

[57] ABSTRACT

A camera includes a light measuring circuit for performing measurement of a luminance of a subject, a computing circuit for performing a computation on an aperture value and/or a shutter speed by using a result of the measurement performed by the light measuring circuit, a switching device for switching the photographic mode of the camera, a locking device for locking the aperture value and/or the shutter speed computed by the computing circuit, and a controlling circuit for causing the computing circuit to compute, if the photographic mode is switched to another photographic mode by the switching device after the aperture value and/or the shutter speed has been locked by the locking device, a new aperture value and/or a new shutter speed corresponding to the aforesaid other photographic mode by using the result of the measurement performed by the light measuring circuit.

5 Claims, 7 Drawing Sheets

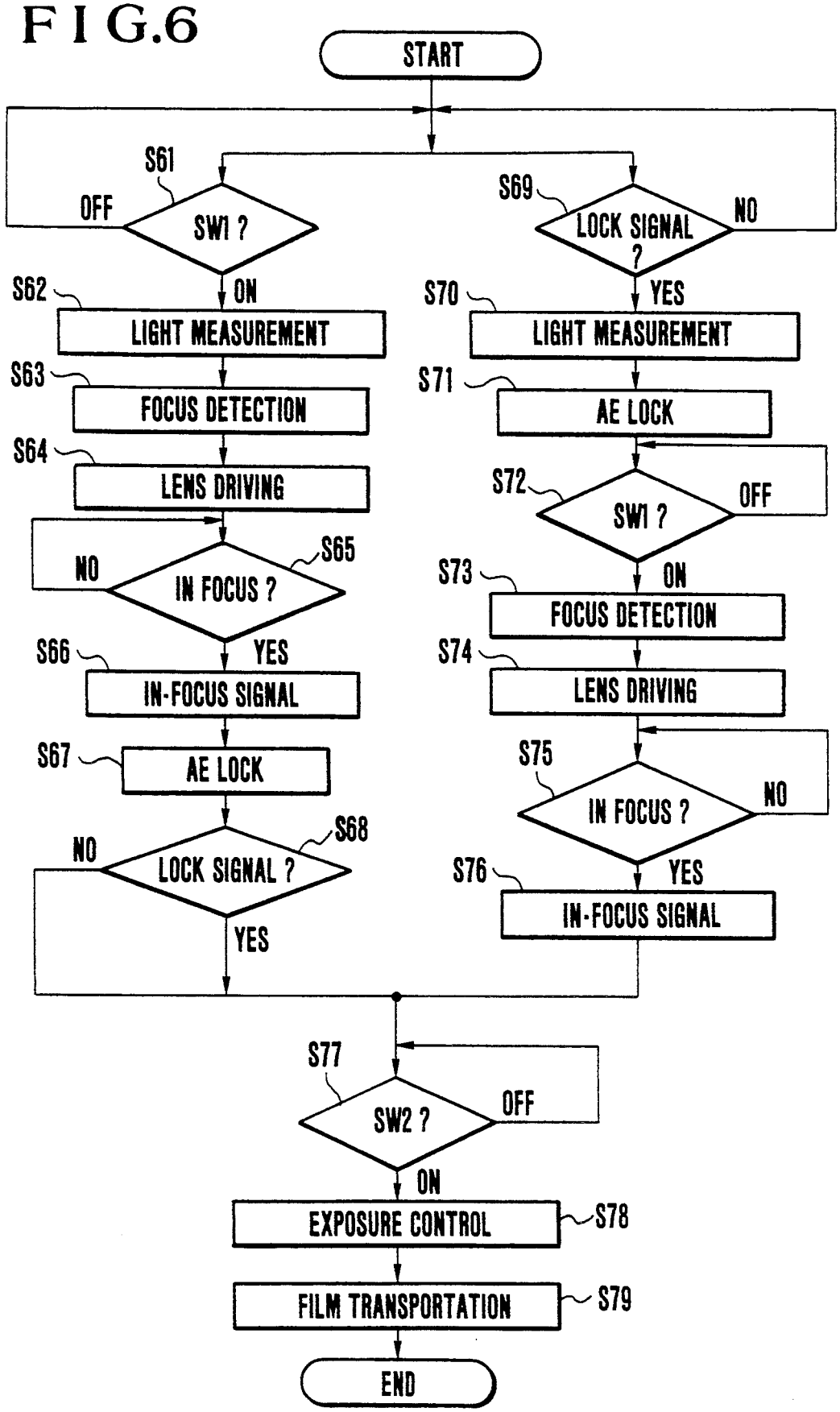

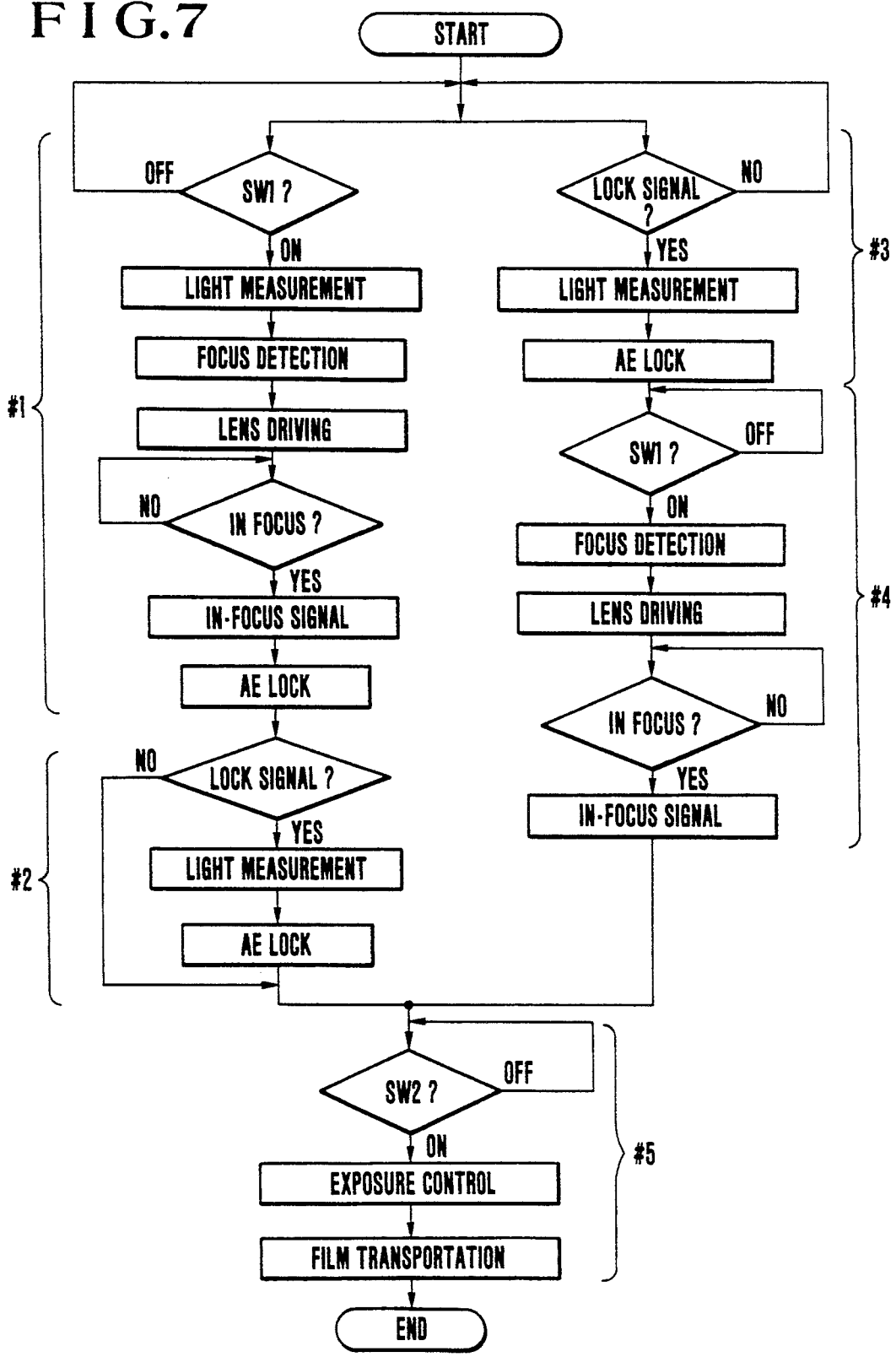

CAMERA

BACKGROUND OF THE INVENTION

1. Field of the Invention

The present invention relates to a camera capable of finding an aperture value and/or a shutter speed by computations based on the result of a light measurement and provided with lock means for maintaining the settings obtained by the computations.

2. Description of the Related Art

A number of proposals have heretofore been made with respect to the way in which exposure is controlled when a camera is switched from one photographic mode to another with an AE lock being set (AE lock serves to lock an aperture value and/or a shutter speed computed on the basis of the result of a light measurement). In one proposed system, if a photographer switches a camera from one photographic mode to another, the AE lock of the camera is cancelled to clear all the AE values, and the camera is placed in a standby state. When the photographer operates the camera to again perform a light measurement, the AE lock is applied to the result of the light measurement in response to an in-focus signal or a lock signal associated with a manual operation, and exposure control based on the AE lock is performed.

In another proposed system, if a camera is switched from one photographic mode to another, the AE lock of the camera is cancelled to clear all of the AE values. Then, a light measurement is again performed automatically and new AE values are found by using an exposure computing formula according to the selected photographic mode. The AE lock is applied to the new AE values and exposure control based on the AE lock is performed.

However, in the former system, if the camera is switched from one photographic mode to another, the AE lock which has been intentionally applied to the AE values by the photographer is completely cancelled, so that a photographic intention which the photographer had when the AE lock was first set will be ignored. In addition, since the photographer must set the AE lock again, the operability of the camera is impaired.

In the latter system, if the camera is switched from one photographic mode to another, the AE lock is again set automatically. More specifically, after all the AE values are cleared, a light measurement is again performed to obtain updated the AE values and AE lock is applied to the updated AE values. An actual exposure result will, therefore, differ from the exposure that the photographer had intended when the AE lock was set, with the result that the photographic intention of the photographer will be ignored.

For example, a conventional exposure control device for a camera capable of setting AE lock in response to either of in-focus and lock signals is arranged to operate as shown in FIG. 7. As shown, even if there is a result of a light measurement to which the AE lock has previously been applied in response to an in-focus signal (Step Group #1), if a lock signal is outputted in response to a manual operation, a light measurement is again performed to update the AE values and the AE lock is applied to the updated AE values (Step Group #2). On the other hand, if there is a result of a light measurement to which the AE lock has previously been applied in response to a lock signal (Step Group #3), even if an in-focus signal is outputted, the AE values remain locked and are not updated (Step Group #4), that is to say, the lock signal has priority over the in-focus signal. When a release button is depressed to a second stroke position, exposure of film is executed in accordance with an aperture value and a shutter speed which have been locked by any one of the aforesaid AE lock operations, and the film is then transported (Step Group #5).

However, the above-described conventional example which shown in FIG. 7, still has a number of disadvantages. In the above-described sequence including the steps of locking AE values in response to an in-focus signal, updating the AE values in response to a lock signal and locking the updated AE values, if a photographer presses the release button unintentionally or accidentally so that a lock signal is outputted, the desired AE values are updated and AE lock is applied to the updated AE values. As a result, exposure control is executed which differs from the intention of the photographer.

SUMMARY OF THE INVENTION

It is, therefore, a primary object of the present invention to provide a camera capable of realizing exposure control which has respect for the intention of a photographer.

To achieve the above object, according to one aspect of the present invention, there is provided a camera in which if its photographic mode is switched with the AE lock applied to measured-light data, no light measurement is performed and only an exposure computing formula is altered to match the selected photographic mode, and then exposure computations using the measured-light data are performed and the AE lock is applied to the result of the exposure computations.

To achieve the above object, according to another aspect of the present invention, there is provided a camera in which if the AE lock is first applied to the AE values in response to an in-focus signal, the AE values are not updated even if a lock signal is outputted in response to a subsequent AE lock operation, whereas if the AE lock is first applied to the AE values in response to a lock signal, the AE values are not updated even if an in-focus signal is subsequently outputted.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 6 is a flowchart showing the operation of the third embodiment of the present invention; and FIG. 7 is a flowchart showing the operation of a related-art example.

DETAILED DESCRIPTION OF THE PREFERRED EMBODIMENTS

Figure 1C:
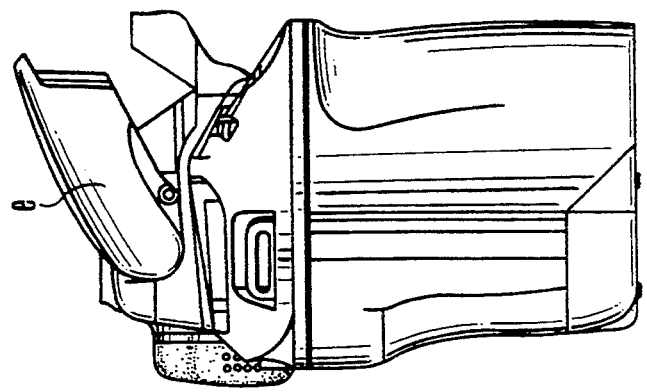
FIGS. 1(a), 1(b) and 1(c) are diagrammatic views showing the external appearance of a camera to which each of first to third embodiments of the present invention is applied.
Figure 1A:
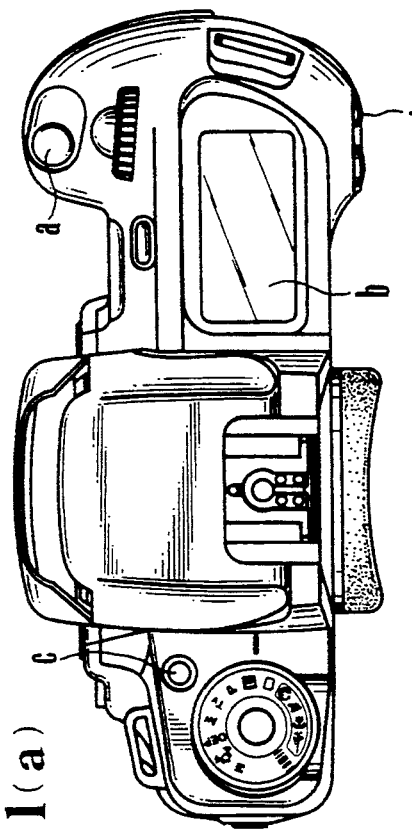
Figure 1B:
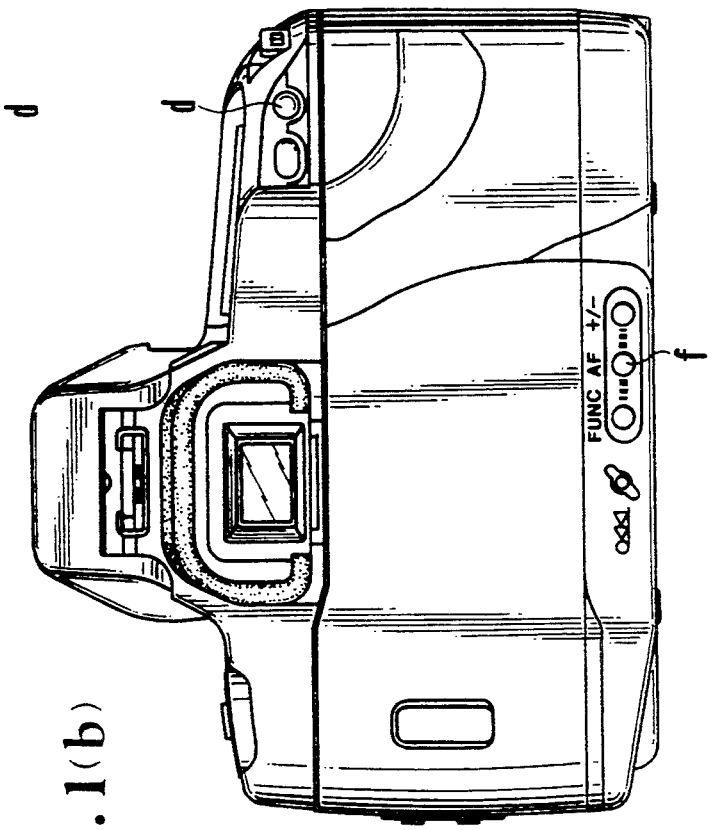

FIGS. 1(a), 1(b) and 1(c) show a camera to which each of the first to third embodiments of the present invention is applied. When a release button "a" is pressed halfway down after an electrical power source (not shown) for the camera has been turned on, a switch SW1 (refer to FIG. 2) is turned on in association with the operation of the release button "a". In response to the turn-on operation of the switch SW1, light measurement, exposure computations and focus detection are executed, and a focusing lens (not shown) is driven. When the focusing lens reaches an in-focus position and an in-focus signal is outputted, the AE lock is set. A lens aperture value and a shutter speed, which are determined when the AE lock is set, are displayed on a display "b". In this state, if a mode switching button "c" is pressed to switch the photographic mode of the camera, re-computations using measured-light data obtained from the light measurement are performed on the basis of an exposure computing formula which is selected in accordance with the switching of the photographic mode. Thus, the lens aperture value and the shutter speed are updated and the AE lock is set.

If an AE lock button "d" is pressed after the electrical power source for the camera has been turned on, a lock signal is outputted, and light measurement and exposure computations are executed and the AE lock is set. In this state, if the mode switching button "c" is pressed to switch the photographic mode of the camera, re-computations using measured-light data obtained from the light measurement are performed on the basis of an exposure computing formula which is selected in accordance with the switching of the photographic mode. Thus, the lens aperture value and the shutter speed are updated and the AE lock is set. In FIG. 1(c), an element indicated by symbol "e" is a built-in flash unit.

Then, when the release button "a" is fully pressed down and a switch SW2 (refer to FIG. 2) is turned on, exposure is executed in accordance with the locked AE values and the selected photographic mode.

Figure 2:
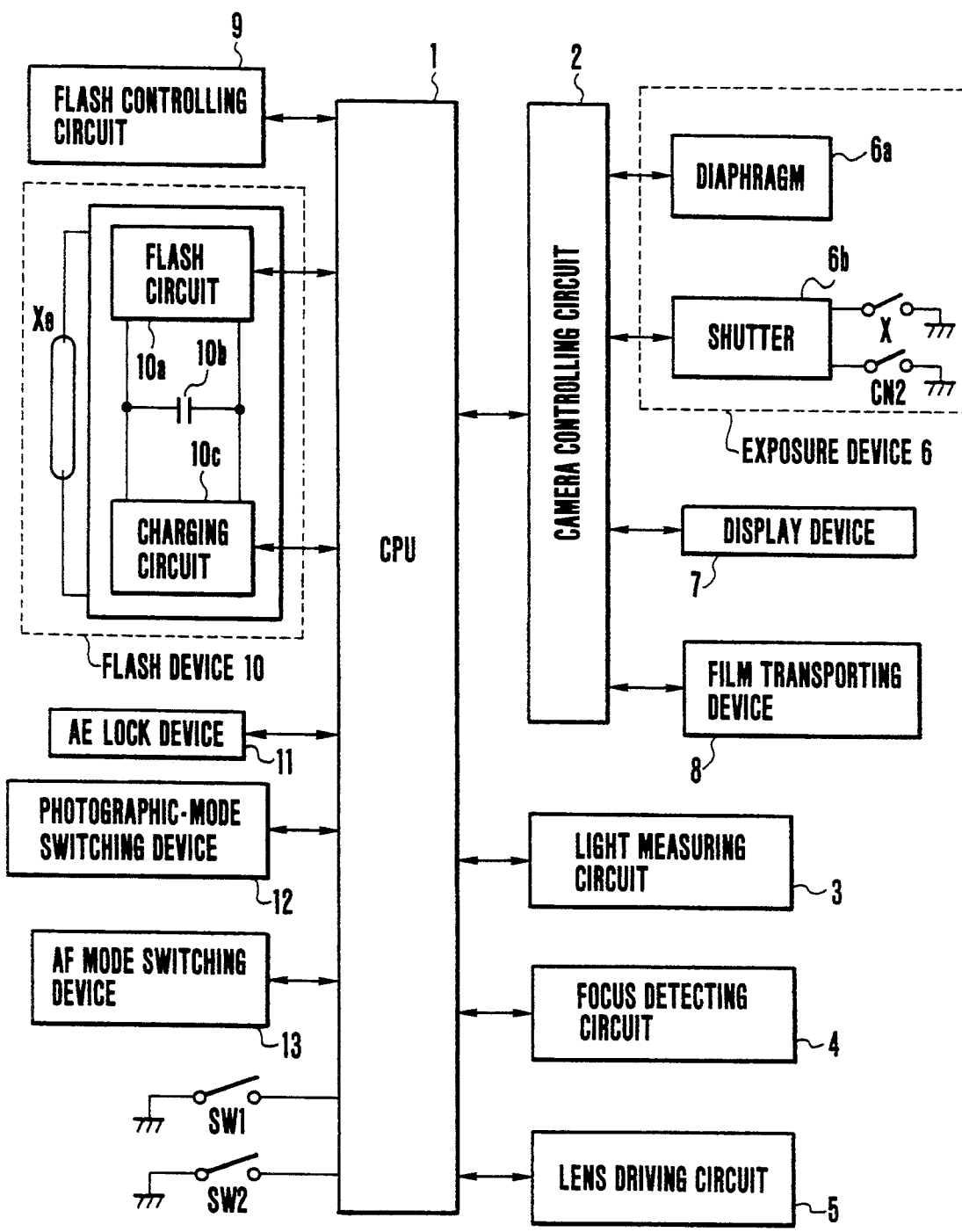
FIG. 2 is a block diagram showing the circuit arrangement of the camera to which the first embodiment of the present invention is applied.

FIG. 2 is a block diagram showing the circuit arrangement of the camera to which the first embodiment of the present invention is applied.

The following elements are connected to a CPU 1 via signal transmission lines: a camera controlling circuit 2, a light measuring circuit 3, a focus detecting circuit 4, a lens driving circuit 5, a flash controlling circuit 9, a flash device 10, an AE lock device 11, a photographic-mode switching device 12, an AF mode switching device 13, and the release switches SW1 and SW2 each of which is associated with an operation of the release button "a" (the release switch SW1 is turned on at a first stroke of the release button "a", and the release switch SW2 is turned on at a second stroke of the release button "a").

Elements connected to the camera controlling circuit 2 are an exposure device 6 including a diaphragm 6a and a shutter 6b which are provided in a lens system (not shown), a display device 7 (the display "b" in FIG. 1(a)) such as a liquid-crystal display, and a film transporting device 8 for performing film winding or film rewinding. In accordance with a command sent from the CPU 1, the camera controlling circuit 2 displays information relative to photography, such as a lens aperture value and a shutter speed, on the display device 7 (the display "b"), and executes photography by driving the exposure device 6, the film transporting device 8 and other associated elements.

The light measuring circuit 3 has a light receiving element for receiving light from a subject, and supplies an output from the light receiving element to the CPU 1 as measured-light data. The focus detecting circuit 4 has a pair of light receiving elements such as CCDs, and forms a pair of subject images on the light receiving elements through a photographic lens (not shown). On the basis of an electrical signal from each of the light receiving elements, the focus detecting circuit 4 outputs to the CPU 1 a focus detection signal indicative of the amount and direction of deviation between an ideal image-forming plane and an image-forming plane in which the subject image is formed.

The lens driving circuit 5 communicates with a CPU provided in the lens system, and controls the driving of a motor provided in the lens system, in accordance with a lens drive signal from the CPU 1, thereby executing focusing so that an in-focus state is reached.

The flash device 10 has a xenon tube Xe which serves as a light flashing element, a flash circuit 10a for controlling the start and stop of a flashing of the xenon tube Xe, a main capacitor 10b for storing a voltage which is charged for the purpose of flashing the xenon tube Xe, and a charging circuit 10c for charging the main capacitor 10b. When charging of the main capacitor 10b is completed and flashing of the xenon tube Xe becomes possible, the charging circuit 10c outputs a charging completion signal to the CPU 1. If the charging completion signal is inputted to the CPU 1, the CPU 1 outputs a flashing start signal to the flash circuit 10a when the switch SW2 (to be described later) is turned on. In response to the flashing start signal, the flash circuit 10a supplies the charged voltage of the main capacitor 10b to the xenon tube Xe, thereby starting a flashing of the xenon tube Xe.

The flash controlling circuit 9 measures the amount of light flashed from the xenon tube Xe and outputs the measured amount to the CPU 1 as flash-controlling data indicative of the amount of flashed light. The flash-controlling data indicative of the amount of flashed light is compared with reference data indicative of the reference amount of flashed light determined by a film sensitivity and the like. If the measured amount of flashed light reaches the reference amount of flashed light, a flashing stop signal is inputted from the CPU 1 to the flash circuit 10a. When receiving the flashing stop signal, the flash circuit 10a inhibits the charged voltage from being supplied to the xenon tube Xe and stops the flashing of the xenon tube Xe.

The AE lock device 11 outputs a lock signal to the CPU 1 in accordance with a manual operation for setting the AE lock before an exposure operation.

If the photographic mode of the camera is switched in accordance with an automatic or arbitrary manual operation before an exposure operation, the photographic-mode switching device 12 outputs to the CPU 1 a photographic-mode signal indicative of the latest photographic mode. The CPU 1 performs computations using an exposure computing formula determined in accordance with the photographic-mode signal.

If the AF mode of the camera is switched in accordance with an automatic or arbitrary manual operation before an exposure operation, the AF-mode switching device 13 outputs to the CPU 1 an AF-mode signal indicative of the latest AF mode. The CPU 1 performs detection of the focus of a subject as well as lens driving on the basis of an focus-detection computing formula determined in accordance with the AF-mode signal.

A release switch is made up of the switch SW1 and the switch SW2. The switch SW1 is turned on when the release button "a" is pressed halfway down (to the first stroke position), and when the release button "a" is fully pressed down (to the second stroke position), the switch SW2 is turned on.

When the switch SW1 is turned on, the CPU 1 actuates the light measuring circuit 3, the focus detecting circuit 4 and the lens driving circuit 5. The CPU 1 calculates a subject luminance as well as a lens aperture value and a shutter speed, on the basis of measured-light data supplied from the light measuring circuit 3, and displays the calculated values on the display device 7 via the camera controlling circuit 2. In addition, the CPU 1 detects the distance to the subject on the basis of a focus detection signal supplied from the focus detecting circuit 4, and calculates the amount of lens driving required to move the focusing lens to an in-focus position and outputs the calculated amount of lens driving to the lens driving circuit 5 as a lens drive signal. The lens driving circuit 5 controls the driving of the focusing lens to execute focusing, on the basis of the lens drive signal. When an in-focus state is reached, the focus detecting circuit 4 outputs an in-focus signal. When receiving the in-focus signal, the CPU 1 stores the measured-light data as well as the calculated lens aperture value and shutter speed into a memory and sets the AE lock. In this state, if the photographic mode is switched by the photographic-mode switch device 12 and a photographic-mode signal indicative of the latest photographic mode is inputted to the CPU 1, the CPU 1 changes the old exposure computing formula into a new one and calculates the subject luminance by using the new exposure computing formula on the basis of the measured-light data which was stored in the memory when the CPU 1 received the in-focus signal. Then, the CPU 1 updates the lens aperture value and the shutter speed and sets the AE lock. When the switch SW2 is turned on, the CPU 1 drives the exposure device 6 through the camera controlling circuit 2 to execute photography, in accordance with the locked AE values and the selected photographic mode.

The operation of the first embodiment of the present invention will be described below with reference to the flowchart of FIG. 3.

When a power switch (not shown) is turned on, supply of electricity to the CPU 1 is started and the shown sequence is started.

Step S10 is repeatedly executed until the switch SW1 is turned on. When the switch SW1 is turned on, the light measuring circuit 3, the focus detecting circuit 4 and the lens driving circuit 5 are actuated in a sequence which will be described below.

In Step S12, the light measuring circuit 3 is actuated to measure the brightness of a subject, and outputs the result of the measurement to the CPU 1 as measured-light data.

In Step S13, a subject luminance is calculated on the basis of the measured-light data outputted from the light measuring circuit 3, and a lens aperture value and a shutter speed are determined from the subject luminance and an ISO sensitivity. The lens aperture value and the shutter speed are displayed on the display device 7 through the camera controlling circuit 2. If an aperture priority mode is selected, only a shutter speed is computed, while if a shutter priority mode is selected, only an aperture value is computed.

In Step S14, the focus detecting circuit 4 is actuated to output the amount and direction of defocus of an image-forming plane to the CPU 1 as a focus detection signal. The CPU 1 calculates the amount of lens driving required to move the focusing lens to an in-focus position on the basis of the focus detection signal and outputs the calculated amount of lens driving to the lens driving circuit 5 as a lens drive signal.

In Step S15, the lens driving circuit 5 is actuated to drive the focusing lens to the in-focus position, on the basis of the lens drive signal.

Step S16 is repeatedly executed until the focusing lens reaches the in-focus position. When the focusing lens reaches the in-focus position, the process proceeds to Step S17.

In Step S17, an in-focus signal, which indicates that the focusing lens has reached the in-focus position, is outputted to the CPU 1.

In Step S18, when receiving the in-focus signal, the CPU 1 stores the measured-light data as well as the lens aperture value and the shutter speed into the memory and sets the AE lock.

In Step S19, it is determined whether the photographic mode has been switched. If it is determined that no such switching has been executed, the process proceeds to Step S23 with the AE lock set in Step S18 being maintained. If the photographic mode is switched by the photographic-mode switching device 12 in accordance with an automatic or arbitrary manual operation, a photographic-mode signal is outputted to the CPU 1 and the process proceeds to Step S20.

In Step S20, the CPU 1 determines a new exposure computing formula in accordance with the latest photographic mode, and performs exposure computations by using the new exposure computing formula on the basis of the measured-light data which was stored in the memory when the CPU 1 received the in-focus signal. The CPU 1 updates the lens aperture value and/or the shutter speed and displays the updated value on the display device 7 through the camera controlling circuit 2.

In Step S21, the updated value, i.e., the updated lens aperture value and/or the updated shutter speed, is stored in the memory and AE lock is set.

In Step S22, it is again determined whether the photographic mode has been switched. If it is determined that such switching has been executed, the process proceeds to Step S20, in which the above-described processing is executed. Subsequently, each time the photographic mode is switched, the current AE value is updated and the updated AE value is locked. If no such switching is executed, the process proceeds to Step S23 with the latest AE value locked.

In Step S23, a decision is made as to the latest photographic mode. In the case of a flash photography mode, the process proceeds to Step S27. If the flash photography mode is not selected, that is, in the case of a daylight photography mode, the process proceeds to Step S24.

Step S24 is repeated until the switch SW2 is turned on. If the switch SW2 is turned on, the process proceeds to Step S25.

In Step S25, the CPU 1 drives the diaphragm 6a and the shutter 6b of the exposure device 6 through the camera controlling circuit 2 in accordance with the locked latest AE value, thereby executing exposure control. When the exposure control is completed, the process proceeds to Step S26.

In Step S26, the film transporting device 8 is actuated to transport film up to the next frame, and the sequence is brought to an end.

If it is determined in Step S23 that the selected photographic mode is the flash photography mode, the process proceeds to Step S27.

In Step S27, the charging circuit 10c is actuated to start supplying electricity to the main capacitor 10b.

In Step S28, it is determined whether charging of the flash device 10 has been completed. If the charging has not yet been completed, the process proceeds to Step S27, in which the supply of electricity to the main capacitor 10b is continued. If the charging is completed, a charging completion signal is outputted to the CPU 1, and the process proceeds to Step S29.

Step S29 is repeatedly executed until the switch SW2 is turned on. When the switch SW2 is turned on, the process proceeds to Step S30.

In Step S30, the CPU 1 drives the diaphragm 6a and the shutter 6b of the exposure device 6 through the camera controlling circuit 2 in accordance with the locked latest AE value, thereby executing exposure control. The shutter 6b is provided with a switch X and a switch CN2. The switch X is turned on when running of a shutter leading curtain is completed, while the switch CN2 is turned on when running of a shutter trailing curtain is completed.

Step S31 is repeatedly executed from the time of start of the running of the shutter 6b until the running of the shutter leading curtain is completed and the switch X is turned on. When the switch X is turned on, the process proceeds to Step S32.

In Step S32, the flash circuit 10a of the flash device 10 is actuated to cause the xenon tube Xe to flash light, thereby illuminating the subject. The flash controlling circuit 9 is also actuated to measure the amount of light flashed from the xenon tube Xe, and stops the flashing of the xenon tube Xe when the reference amount of flashed light is reached. Then, the process proceeds to Step S33.

After the flashing of the xenon tube Xe has been ended, Step S33 is repeatedly executed until the leading curtain of the shutter 6b runs and the switch CN2 is turned on. When the switch CN2 is turned on, the process proceeds to Step S34.

In Step S34, shutter charging is performed and the shutter leading curtain and the shutter trailing curtain are both placed in their standby states. The process proceeds to Step S26, in which film transportation is executed in the above-described manner, and the sequence is brought to an end.

Figure 4:
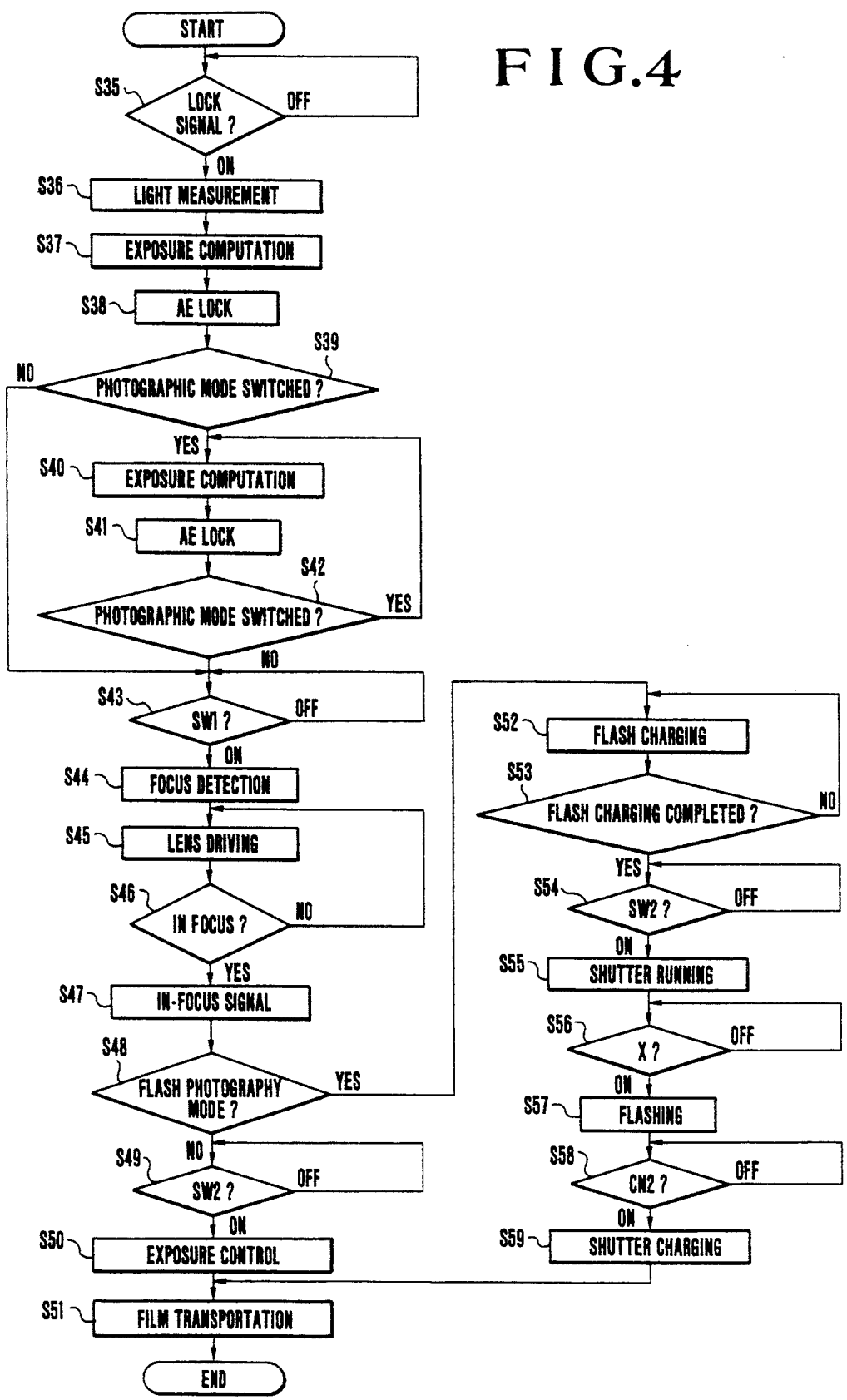
FIG. 4 is a flowchart showing the operation of the second embodiment of the present invention.

The second embodiment of the present invention will be described below with reference to FIG. 4.

In the following description of the second embodiment as well, the circuit block diagram shown in FIG. 2 is used.

When the power switch (not shown) is turned on, supply of electricity to the CPU 1 is started and the shown sequence is started.

Step S35 is repeatedly executed until a lock signal is outputted in accordance with a manual operation for setting the AE lock. When the lock signal is outputted, the process proceeds to Step S36.

Figure 3:
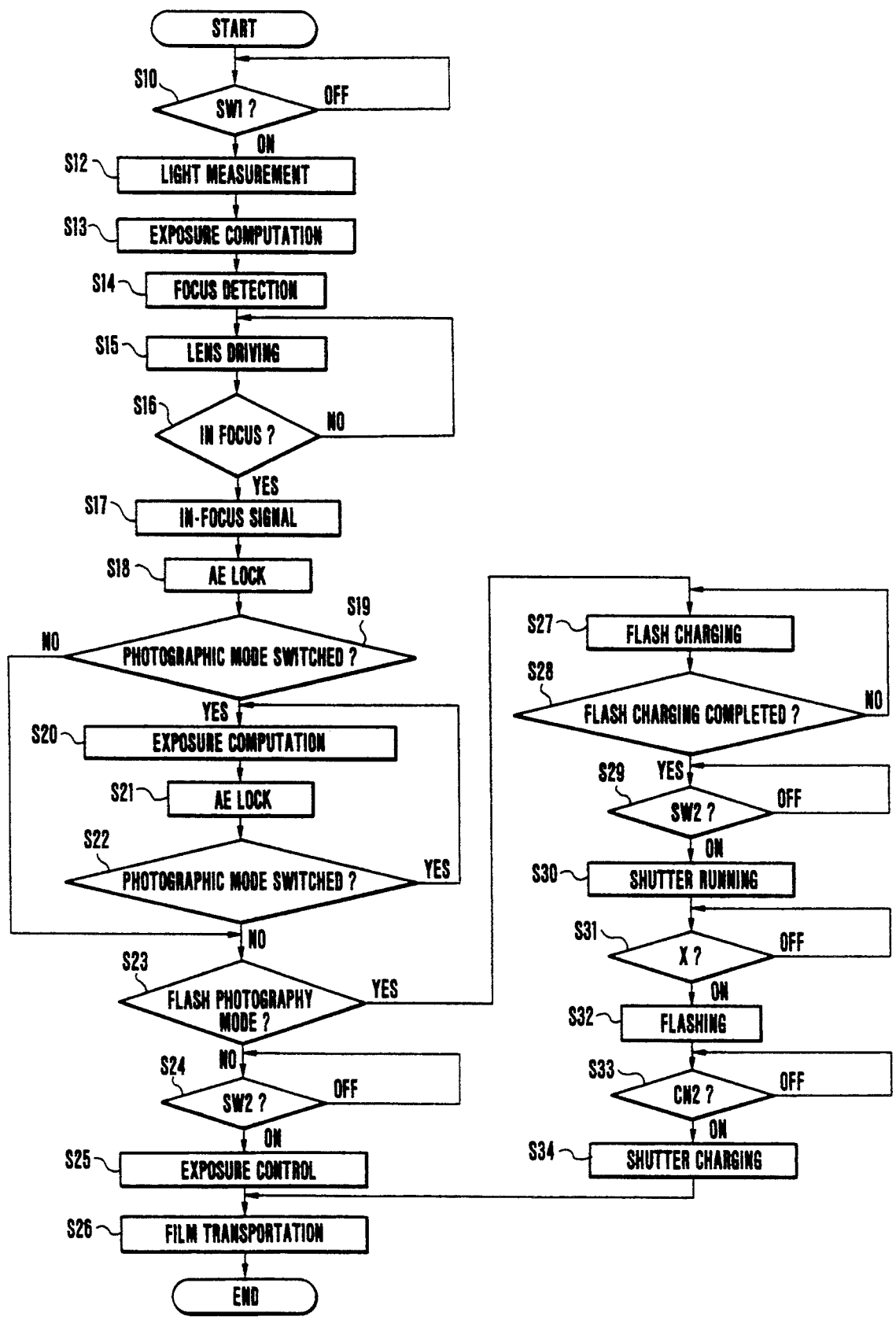
FIG. 3 is a flowchart showing the operation of the first embodiment of the present invention.

Steps S36 and S37 correspond to Steps S12 and S13 of FIG. 3, and similar processing is executed.

In Step S38, when receiving the lock signal, the CPU 1 stores measured-light data as well as a lens aperture value and a shutter speed into the memory and sets the AE lock.

In Step S39, it is determined whether the photographic mode has been switched with the AE lock set by the lock signal. This processing is performed similarly to Step S19 of FIG. 3.

Steps S40 to S42 correspond to Steps S20 to S22 of FIG. 3, and similar processing is executed.

Step S43 is repeatedly executed until the switch SW1 is turned on. When the switch SW1 is turned on, the process proceeds to Step S44.

Steps S44 to S47 correspond to Steps S14 to S17 of FIG. 3, and similar processing is executed. The process proceeds to Step S48.

Steps S48 to S59 correspond to Steps S23 to S34 of FIG. 3, and similar processing is executed. The shown sequence is thus brought to an end.

The above description has referred to the case where the AE lock is first set by the lock signal. In contrast, if the AE lock is first set by an in-focus signal and the AE lock is then updated by the lock signal before an exposure operation, exposure computations corresponding to a selected photographic mode are performed on the basis of the latest measured-light data.

The third embodiment of the present invention will be described below with reference to FIGS. 5 and 6.

Figure 5:
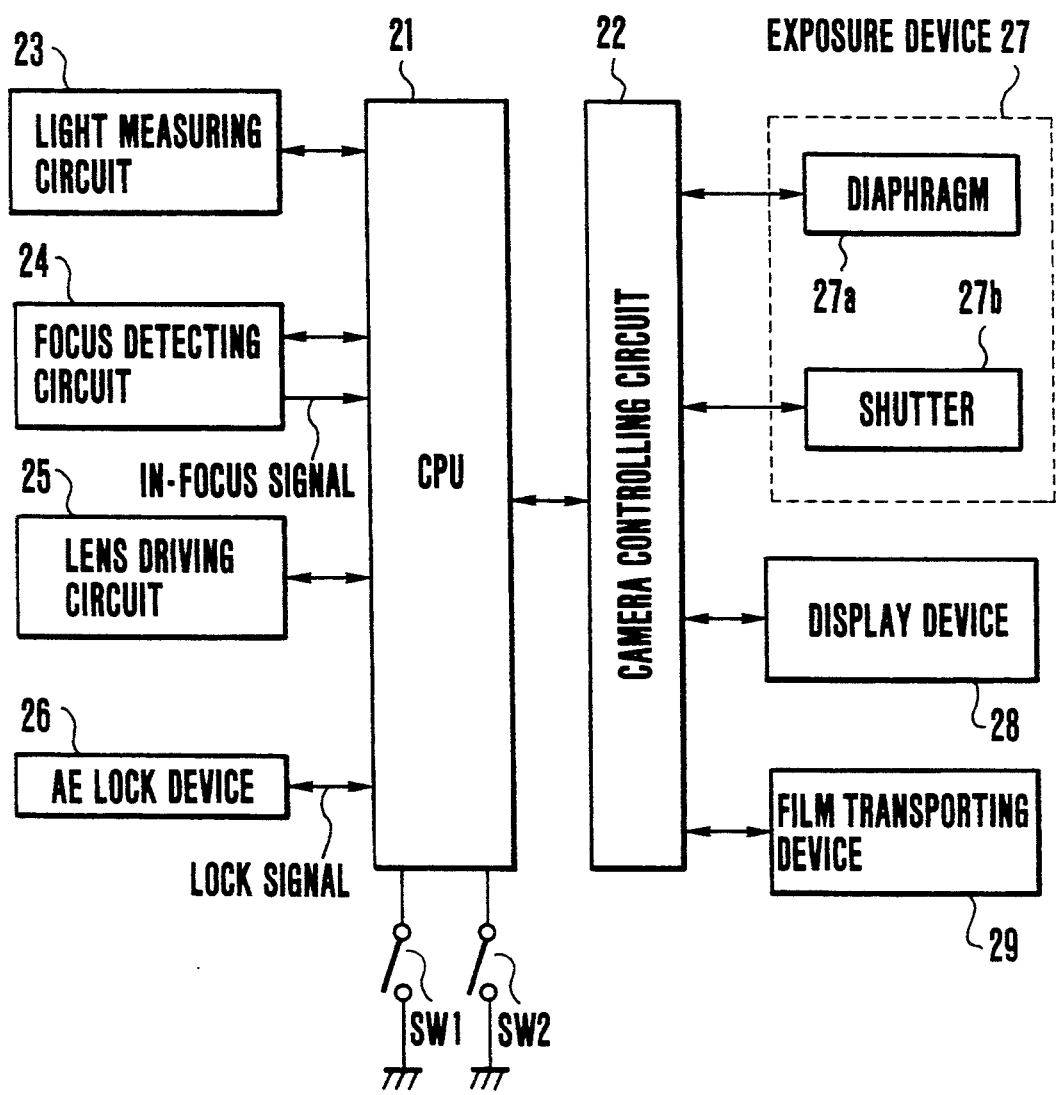
FIG. 5 is a block diagram showing the circuit arrangement of the camera to which the third embodiment of the present invention is applied.

FIG. 5 is a block diagram showing the circuit arrangement of the third embodiment of the present invention.

The following elements are connected to a CPU 21 via signal transmission lines: a camera controlling circuit 22, a light measuring circuit 23, a focus detecting circuit 24, a lens driving circuit 25, and an AE lock device 26.

Elements connected to the camera controlling circuit 22 are an exposure device 27 including a diaphragm 27a and a shutter 27b, a display device 28 such as a liquid-crystal display, and a film transporting device 29 for performing film winding or film rewinding. In accordance with a command sent from the CPU 21, the camera controlling circuit 22 displays information relative to photography, such as an aperture value and a shutter speed, on the display device 28, and executes photography by driving the exposure device 27, the film transporting device 29 and other associated elements.

The light measuring circuit 23 has a light receiving element for receiving light from a subject, and supplies an output from the light receiving element to the CPU 21 as measured-light data. The focus detecting circuit 24 has a pair of light receiving elements such as CCDs, and forms a pair of subject images on the light receiving elements through a photographic lens (not shown). The lens driving circuit 25 communicates with a focusing lens system (not shown), and controls the driving of a motor provided in the focusing lens system, in accordance with a lens drive signal from the CPU 21, thereby executing focusing. When an in-focus state is reached, the focus detecting circuit 24 outputs an in-focus signal to the CPU 21. The AE lock device 26 outputs a lock signal to the CPU 21 in accordance with a manual operation at a desired time before an exposure operation.

A release switch operative in association with an operation of the release button "a" shown in FIG. 1 is connected to the CPU 21. The release switch is made up of the switch SW1 and the switch SW2. The switch SW1 is turned on when the release button "a" is pressed halfway down (to the first stroke position), and when the release button "a" is fully pressed down (to the second stroke position), the switch SW2 is turned on.

When the switch SW1 is first turned on, the CPU 21 actuates the light measuring circuit 23, the focus detecting circuit 24 and the lens driving circuit 25. The CPU 21 calculates a subject luminance as well as a lens aperture value and a shutter speed, on the basis of measured-light data supplied from the light measuring circuit 23, and displays the calculated values on the display device 28 via the camera controlling circuit 22. In addition, the CPU 21 calculates the amount of lens driving required to move the focusing lens system to an in-focus position, on the basis of a focus detection signal supplied from the focus detecting circuit 24, and outputs the calculated amount of lens driving to the lens driving circuit 25 as a lens drive signal. The lens driving circuit 25 controls the driving of the focusing lens system to execute focusing, on the basis of the lens drive signal. When an in-focus state is reached, the focus detecting circuit 24 outputs an in-focus signal. When receiving the in-focus signal, the CPU 21 stores, into a memory, the subject luminance calculated on the basis of the measured-light data as well as the calculated lens aperture value and shutter speed and sets the AE lock.

When a lock signal is first inputted from the AE lock device 6 to the CPU 21, the CPU 21 actuates the light measuring circuit 23. The CPU 21 stores, into the memory, a subject luminance, a lens aperture value and a shutter speed all of which are computed on the basis of measured-light data supplied from the light measuring circuit 23, and sets the AE lock. Thereafter, when the switch SW1 is turned on, the CPU 21 actuates the focus detecting circuit 24 and the lens driving circuit 25, thereby executing focusing of the focusing lens system in a manner similar to the above-described manner. When the switch SW2 is turned on with AE lock being set, the CPU 21 actuates the exposure device 27 through the camera controlling circuit 22, thereby executing photography.

The operation of the third embodiment of the present invention will be described below with reference to the flowchart of FIG. 6.

When the power switch (not shown) is turned on, supply of electricity to the CPU 21 is started and the shown sequence is started.

If an ordinary release operation is to be first performed, the process proceeds to Step S61. However, if a release operation is to be performed after the AE lock is first set by a manual operation, the process proceeds to Step S69.

Step S61 is repeatedly executed until the switch SW1 is turned on. When the switch SW1 is turned on, the light measuring circuit 23, the focus detecting circuit 24 and the lens driving circuit 25 are actuated in a sequence which will be described below.

In Step S62, the CPU 21 reads measured-light data from the light measuring circuit 23, and calculates a subject luminance on the basis of the measured-light data and then calculates an aperture value and/or a shutter speed from the subject luminance and an ISO sensitivity. The lens aperture value and the shutter speed are outputted to the camera controlling circuit 22, which displays these values on the display device 28.

The process proceeds to Step S63, in which the CPU 21 reads a focus detection signal from the focus detecting circuit 24, and calculates the amount and direction of defocus of a subject image on the basis of the focus detection signal and also calculates the amount of lens driving required to move the focusing lens to an in-focus position on the basis of the focus detection signal. The CPU 21 outputs the calculated amount of lens driving to the lens driving circuit 25 as a lens drive signal.

In Step S64, the focusing lens is driven up to the in-focus position, on the basis of the lens drive signal.

Step S65 is repeatedly executed until the focusing lens reaches the in-focus position.

In Step S66, when the focusing lens reaches the in-focus position, the focus detecting circuit 24 outputs an in-focus signal.

In Step S67, when receiving the in-focus signal, the CPU 21 stores into the memory the measured-light data, the lens aperture value and the shutter speed which have been calculated in Step S62, and sets the AE lock. Subsequently, the set AE lock is maintained until the switch SW1 is turned off.

In Step S68, even if a lock signal is outputted in accordance with a manual operation, the process proceeds to Step S77 with the set AE lock maintained.

Step S69 is repeatedly executed until a lock signal is outputted in accordance with a manual operation. If the lock signal is outputted, the process proceeds to Step S70.

Step S70 is executed similarly to Step S62, and the process proceeds to Step S71.

Step S71 is executed similarly to Step S67, and the process proceeds to Step S72.

Step S72 is repeatedly executed until the switch SW1 is turned on. If the switch SW1 is turned on, the process proceeds to Step S73.

Steps S73 to S76 are executed similarly to Steps S63 to S66. In Step S76, even if an in-focus signal indicative of the in-focus state of the focusing lens is outputted, the process proceeds to Step S77 in the state of the subject luminance, the lens aperture value and the shutter speed which have been stored in the memory in Step S71 being maintained in their locked states.

Step S77 is repeatedly executed until the switch SW2 is turned on. If the release button "a" is fully pressed down and the switch SW2 is turned on, the process proceeds to Step S78.

In Step S78, the CPU 21 drives the diaphragm 27a and the shutter 27b of the exposure device 27 through the camera controlling circuit 22, thereby executing an exposure operation.

In Step S79, the film transporting device 29 is driven to execute film transportation, and the shown sequence is brought to an end.

As is apparent from the foregoing description, in each of the first and second embodiments, the AE lock is applied to measured-light data in response to an in-focus signal or a lock signal which reflects the intention of a photographer, but each time the photographic mode is switched, exposure computations are performed by using the measured-light data to match the selected photographic mode. Accordingly, it is possible to perform exposure control which has respect for and is faithful to the intention of the photographer.

In addition, it is possible to omit a wasteful time of light measurement since no light measurement is performed each time the photographic mode is switched.

In the third embodiment, the AE lock is set by an initial operation which can fully reflect the intention of a photographer, and as long as the set AE lock is maintained, no AE lock occurs due to any other operation.

Accordingly, it is possible to prevent a variation in a measured-light value due to an erroneous operation of the photographer.

In addition, regarding the layout of a manual operating member for the AE lock, it is possible to adopt an arrangement taking account of only an improvement in operability without the need to consider a balance between the improvement in operability and prevention of an erroneous operation.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. A camera comprising:
   (a) light measuring means for performing measurement of a luminance of a subject;
   (b) computing means for performing a computation of at least one of an aperture value and a shutter speed by using a result of the measurement performed by said light measuring means;
   (c) an operating member capable of being manually operated;
   (d) focus detecting means for detecting a state of focus of the subject;
   (e) locking means for locking said aperture value and/or said shutter speed computed by said computing means in response to either an operation of said operating member or when an in-focus signal is outputted from said focus detecting means; and
   (f) controlling means for inhibiting said computing means from performing a computation if said in-focus signal is outputted after said aperture value and/or said shutter speed has been locked by said locking means in accordance with the operation of said operating member, and for inhibiting said computing means from performing a computation if said operating member is operated after said aperture value and/or said shutter speed has been locked by said locking means in accordance with said in-focus signal outputted from said focus detecting means.

2. A camera according to claim 1, wherein said light measuring means, said computing means, said focus detecting means, said locking means and said controlling means are operated in accordance with a program executed by a microcomputer.

3. A camera according to claim 1, wherein said operating member is a push button arranged on a back side of the camera.

4. A camera according to claim 2, wherein said locking means locks the computed aperture value in a shutter priority mode and locks the computed shutter speed in an aperture priority mode.

5. A camera according to claim 2, further comprising:
   a display device for displaying the aperture value and/or the shutter speed computed by said computing means, wherein said display device being controlled by said microcomputer.

* * * * *

UNITED STATES PATENT AND TRADEMARK OFFICE
CERTIFICATE OF CORRECTION

PATENT NO. : 5,396,310
DATED : March 7, 1995
INVENTOR(S) : Takashi FUJIYAMA

It is certified that error appears in the above-indentified patent and that said Letters Patent is hereby corrected as shown below:

Column 1

Line 15, "(AE" should read --(the AE--;
    Line 49, "the" should be deleted and "and" should read --and the--.

Column 2

Line 9, "example" should read -- example,--;
    Line 10, "which" should read --which is--;
    Line 17, "and" should read --and the--;
    Line 54, "first" should read --the first--.

Column 5

Line 2, "an" should read --a--.

UNITED STATES PATENT AND TRADEMARK OFFICE
CERTIFICATE OF CORRECTION

PATENT NO. : 5,396,310
DATED : March 7, 1995
INVENTOR(S) : Takashi FUJIYAMA

It is certified that error appears in the above-indentified patent and that said Letters Patent is hereby corrected as shown below:

<u>Column 9</u>

Line 37, "with" should read --with the--.

<u>Column 12</u>

Line 32, "being" should read --is--.

Signed and Sealed this

Eighteenth Day of July, 1995

Attest:

BRUCE LEHMAN

*Attesting Officer*      *Commissioner of Patents and Trademarks*